(12) United States Patent
Soriaga et al.

(10) Patent No.: US 10,389,503 B2
(45) Date of Patent: Aug. 20, 2019

(54) RECIPROCAL CHANNEL SOUNDING REFERENCE SIGNAL MULTIPLEXING

(71) Applicant: QUALCOMM Incorporated, San Diego, CA (US)

(72) Inventors: Joseph Binamira Soriaga, San Diego, CA (US); Jing Jiang, San Diego, CA (US); Krishna Kiran Mukkavilli, San Diego, CA (US); Pavan Kumar Vitthaladevuni, San Diego, CA (US); Naga Bhushan, San Diego, CA (US); Tingfang Ji, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/811,289

(22) Filed: Nov. 13, 2017

(65) Prior Publication Data
US 2018/0069673 A1  Mar. 8, 2018

Related U.S. Application Data

(63) Continuation of application No. 14/866,778, filed on Sep. 25, 2015, now Pat. No. 9,847,862.
(Continued)

(51) Int. Cl.
*H04B 7/06* (2006.01)
*H04L 5/00* (2006.01)
*H04B 7/0452* (2017.01)

(52) U.S. Cl.
CPC ......... *H04L 5/0048* (2013.01); *H04B 7/0452* (2013.01); *H04B 7/0617* (2013.01); *H04L 5/0051* (2013.01)

(58) Field of Classification Search
None
See application file for complete search history.

(56) References Cited

U.S. PATENT DOCUMENTS

| | | | | |
|---|---|---|---|---|
| 2012/0051265 A1* | 3/2012 | Shen | ...... | H04L 5/0035 370/254 |
| 2012/0307772 A1* | 12/2012 | Kwon | ...... | H04L 5/0007 370/329 |

(Continued)

FOREIGN PATENT DOCUMENTS

| | | |
|---|---|---|
| CN | 102377714 A | 3/2012 |
| WO | WO-0133761 A1 | 5/2001 |

(Continued)

OTHER PUBLICATIONS

International Search Report and Written Opinion—PCT/US2016/016723—ISA/EPO—Jul. 5, 2016.
(Continued)

*Primary Examiner* — Christopher M Crutchfield
*Assistant Examiner* — Alan L Lindenbaum
(74) *Attorney, Agent, or Firm* — Linda G. Gunderson; Haynes and Boone, LLP

(57) ABSTRACT

Systems and techniques are disclosed to enhance the efficiency of available bandwidth between UEs and base stations. A UE transmits a sounding reference signal (SRS) to the base station. The base station characterizes the uplink channel based on the SRS received and, using reciprocity, applies the channel characterization for the downlink channel. As part of applying the channel information, the base station forms the beam to the UE based on the uplink channel information obtained from the SRS. The UE may include an array of antennas, each UE transmitting a different SRS that the base station receives and uses to characterize the downlink. Multiple UEs (or a single UE with multiple antennas) transmit SRS at the same time and
(Continued)

frequency allocation (non-orthogonal), but with each sending its own unique SRS. Further, multiple UEs (or a single UE with multiple antennas) may send their SRS at unique time/frequency allocations (orthogonal).

6 Claims, 12 Drawing Sheets

Related U.S. Application Data

(60) Provisional application No. 62/133,334, filed on Mar. 14, 2015.

(56) References Cited

U.S. PATENT DOCUMENTS

| | | | |
|---|---|---|---|
| 2013/0039319 A1* | 2/2013 | Shi | H04L 5/0023 370/329 |
| 2013/0344881 A1 | 12/2013 | Nakasato | |
| 2014/0086205 A1 | 3/2014 | Nakasato | |
| 2014/0112168 A1 | 4/2014 | Chen et al. | |
| 2016/0020891 A1* | 1/2016 | Jung | H04L 5/0064 370/280 |
| 2016/0081084 A1* | 3/2016 | Blankenship | H04W 4/70 370/329 |
| 2016/0269157 A1 | 9/2016 | Soriaga | |

FOREIGN PATENT DOCUMENTS

| WO | WO-2011134532 A1 | 11/2011 |
|---|---|---|
| WO | WO-2011143586 A1 | 11/2011 |
| WO | WO-2012116486 A1 | 9/2012 |
| WO | WO-2012146188 A1 | 11/2012 |
| WO | WO-2014019213 A1 | 2/2014 |
| WO | WO-2014109686 A1 | 7/2014 |

OTHER PUBLICATIONS

Research in Motion, et al., "Design and Configuration Considerations on Aperiodic SRS for LTE-A," 3GPP Draft; R1-102054 (Consideration Aperiodic SRS for LTE-A), 3rd Generation Partnership Project (3GPP), Mobile Competence Centre; 650, Route Des Lucioles; F-06921 Sophia-Antipolis Cedex; France, vol. RAN WG1, No. Beijing, China; 20100412, Apr. 6, 2010, XP050419384.

* cited by examiner

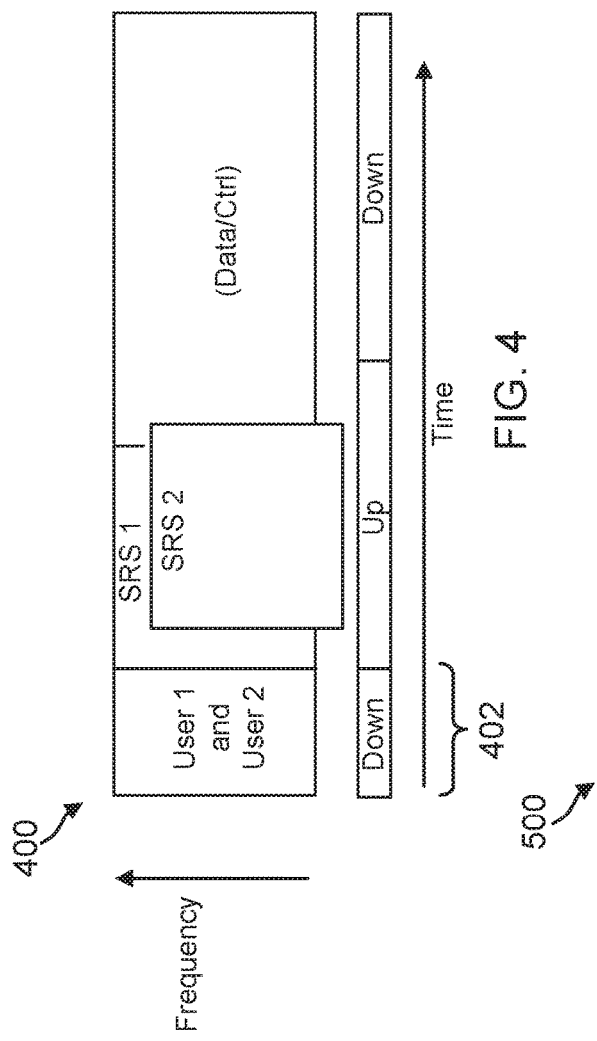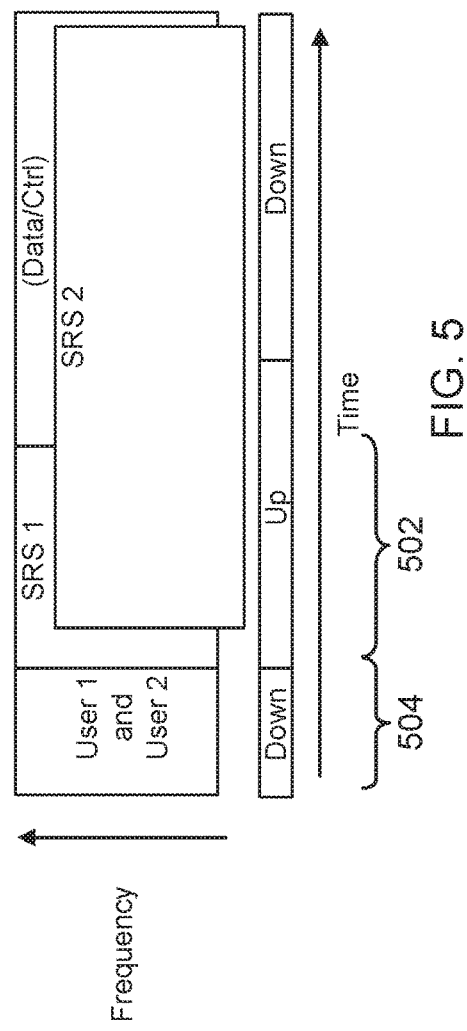
FIG. 4
FIG. 5

RECIPROCAL CHANNEL SOUNDING
REFERENCE SIGNAL MULTIPLEXING

CROSS REFERENCE TO RELATED
APPLICATIONS & PRIORITY CLAIM

The present application is a continuation application of U.S. Non-Provisional patent application Ser. No. 14/866,778, filed Sep. 25, 2015, which claims priority to and the benefit of the U.S. Provisional Patent Application No. 62/133,334, filed Mar. 14, 2015, the disclosure of each of which is hereby incorporated by reference in its entirety.

TECHNICAL FIELD

This application relates to wireless communication systems, and more particularly to using channel state information obtained from an uplink sounding signal in non-orthogonal or orthogonal applications to beamform downlink messages to targeted recipients.

INTRODUCTION

A wireless communication network may include a number of base stations that can support communication for a number of user equipments (UEs). In recent years, the carrier frequencies at which base stations and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, more beam forming gain (and more accurate) is becoming necessary.

Further, conventional systems employ various types of reference signals, with varying fixed structures, to provide sufficient measurements and estimations for adaptive multi-antenna operation in uplink and/or downlink directions. For example, a channel state information reference signal (CSI-RS) may be used on a downlink from the base station to aid the base station in beam form determination, an uplink demodulation reference signal (DM-RS) specific to each UE may be used to estimate channel information for the uplink specifically, and each UE may use a sounding reference signal (SRS) on the uplink to aid in scheduling (e.g., determining which frequency bands are good or bad for data). There is no single signal that is able to achieve all of above functionality for UEs.

Reciprocity describes the ability for a station to use information (such as a multipath delay profile) from one channel (e.g., the uplink) in making determinations regarding another channel (e.g., the downlink). Reciprocity has not been available for cellular networks because current approaches require reference signals specific for particular antennas, such as CSI-RS in the long term evolution (LTE) context. Further, CSI-RS and other types of signals do not scale well, which is becoming an ever-increasing issue as the demand for mobile broadband continues to increase.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method includes receiving, at a base station, a sounding reference signal (SRS) from a user equipment (UE) via an uplink channel; obtaining, by the base station, information from the SRS about the uplink channel and applying the information to a downlink channel; and transmitting, from the base station, a beamformed downlink communication to the UE via the downlink channel based on the information obtained from the SRS.

In an additional aspect of the disclosure, a method for communicating with a base station includes transmitting, from a plurality of user equipments (UEs), a plurality of sounding reference signals (SRSs), wherein the plurality of SRSs are transmitted using non-orthogonal physical resources via corresponding uplink channels; and receiving, from the base station, beamformed downlink communications based on information obtained from the plurality of SRSs about the uplink channels and applied to downlink channels.

In an additional aspect of the disclosure, a method for communicating with a base station includes arranging, at a user equipment (UE) comprising a plurality of antennas, a different sounding reference signal (SRS) corresponding to a different one of the plurality of antennas; transmitting, from the UE, a different sounding reference signal (SRS) from each one of the multiple antennas; and receiving, from the base station, beamformed downlink communications based on information obtained from the different SRS corresponding to each one of the multiple antennas.

In an additional aspect of the disclosure, a method for communicating with a plurality of user equipments (UEs) includes receiving, at a base station, a plurality of sounding reference signals (SRSs), one from each UE from among the plurality of UEs, wherein each SRS is transmitted from each respective UE using orthogonal physical resources; obtaining, by the base station, information from each SRS about the respective uplink channel and applying the information to a respective downlink channel; and transmitting, from the base station, a beamformed downlink communication to each UE via the respective downlink channel based on the information obtained from each SRS.

In an additional aspect of the disclosure, a method for communicating with a base station includes transmitting, from a user equipment (UE), multiple narrowband sounding reference signals (SRSs) at different frequency sub-bands during one subframe; and receiving, from the base station, a beamformed downlink communication based on information obtained from the SRSs corresponding to each of the different frequency sub-bands.

In an additional aspect of the disclosure, a base station includes a transceiver configured to receive a sounding reference signal (SRS) from a user equipment (UE) via an uplink channel; and a processor configured obtain information from the SRS about the uplink channel and apply the information to a downlink channel, wherein the transceiver is further configured to transmit a beamformed downlink communication to the UE via the downlink channel based on the information obtained from the SRS.

In an additional aspect of the disclosure, a user equipment includes a plurality of antennas; a processor configured to arrange a different sounding reference signal (SRS) corresponding to a different one of the plurality of antennas; and a transceiver configured to transmit a different sounding reference signal (SRS) from each one of the multiple antennas to a base station and receive, from the base station, beamformed downlink communications based on information obtained from the different SRS corresponding to each one of the multiple antennas.

In an additional aspect of the disclosure, a computer-readable medium having program code recorded thereon includes program code comprising code for causing a base station to receive a sounding reference signal (SRS) from a user equipment (UE) via an uplink channel; code for causing the base station to obtain information from the SRS about the uplink channel and applying the information to a downlink channel; and code for causing the base station to transmit a beamformed downlink communication to the UE via the downlink channel based on the information obtained from the SRS.

In an additional aspect of the disclosure, a computer-readable medium having program code recorded thereon includes program code comprising code for causing a user equipment (UE) comprising a plurality of antennas to arrange a different sounding reference signal (SRS) corresponding to a different one of the plurality of antennas; code for causing the UE to transmit a different sounding reference signal (SRS) from each one of the multiple antennas to a base station; and code for causing the UE to receive, from the base station, beamformed downlink communications based on information obtained from the different SRS corresponding to each one of the multiple antennas.

In an additional aspect of the disclosure, a base station includes means for receiving a sounding reference signal (SRS) from a user equipment (UE) via an uplink channel; means for obtaining information from the SRS about the uplink channel and applying the information to a downlink channel; and means for transmitting a beamformed downlink communication to the UE via the downlink channel based on the information obtained from the SRS.

In an additional aspect of the disclosure, a user equipment (UE) comprising a plurality of antennas includes means for arranging a different sounding reference signal (SRS) corresponding to a different one of the plurality of antennas; means for transmitting a different sounding reference signal (SRS) from each one of the multiple antennas to a base station; and means for receiving, from the base station, beamformed downlink communications based on information obtained from the different SRS corresponding to each one of the multiple antennas.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 illustrates an exemplary frame structure for a synchronous subframe system with periodic channel decorrelation.

FIG. 5 illustrates an exemplary frame structure for a synchronous subframe system with random channel decorrelation.

DETAILED DESCRIPTION

Figure 1:
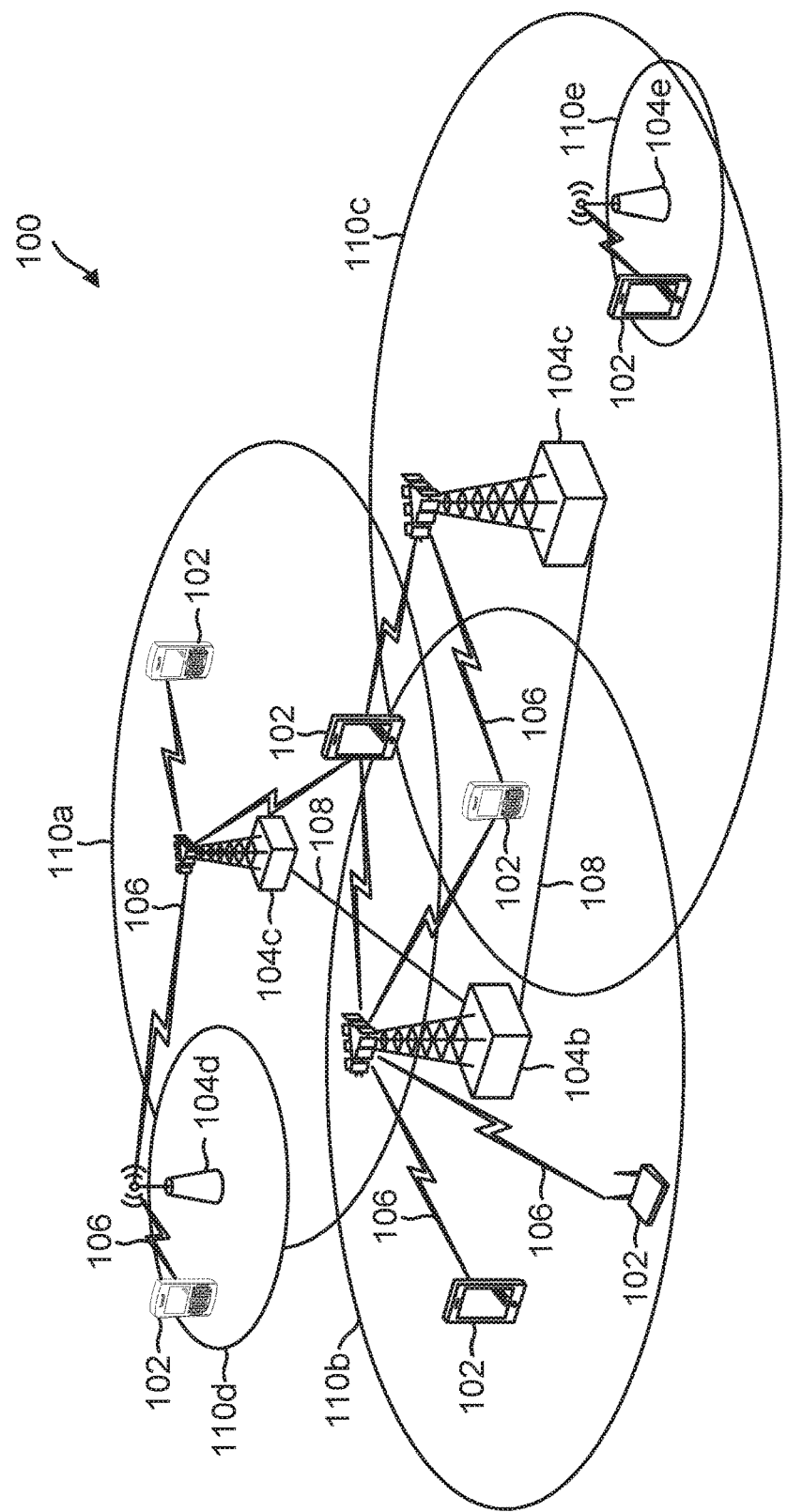
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to enhance the efficiency of use of available bandwidth in wireless communications channels between UEs and base stations. In an embodiment, multiplexing may be used to aid in increasing the efficiency of use of channel resources, such as frequency division multiple access (FDMA), time division multiple access (TDMA), code division multiple access (CDMA), or spatial division multiple access (SDMA). One way of achieving SDMA, or space division multiplexing, is by use of beamforming. If a device has multiple antennas, it may transmit signals from all antennas at once while altering the phase of the signal from each antenna to produce constructive and destructive interference. The interference may be calibrated to produce constructive interference in a specific direction and destructive interference in all other directions, thus essentially transmitting a "beam" of information that does not create interference in any other spatial area. Multiple beams may therefore be transmitted at once in different directions without interference. In order to successfully beamform, the multiple antenna device uses information about the channel between itself and its intended recipient device to create a beam which will reach the recipient.

Thus, according to embodiments of the present disclosure, a base station may harness channel reciprocity in order to use channel information obtained from the uplink channel from a UE to the base station for the downlink. A UE may transmit a sounding reference signal (SRS) to the base station within a single subframe. The base station, in turn, may characterize the uplink channel based on the SRS received and, using reciprocity, apply the same channel characterization for the downlink channel back to the UE. As part of applying the channel information to the downlink, the base station may form the beam to the UE based on the uplink channel information obtained from the SRS.

In further embodiments, the UE may include an array of antennas (MIMO). In that situation, each UE may transmit a different SRS that the base station receives and then uses for the downlink to those various antennas (or, alternatively, multiple UEs with single antennas could be used to same effect). For example, multiple UEs (or a single UE with multiple antennas) may transmit SRS at the same time and at the same frequency allocation (e.g., non-orthogonal), but with each UE sending its own unique SRS (based on unique scrambling codes or interleaving permutations, for example). In another example, multiple UEs (or a single UE with multiple antennas) may send their SRS at unique time/frequency allocations (orthogonal).

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station may also be referred to as a base transceiver station, a node B, or an access point. A base station 104 may be a station that communicates with the UEs 102 and may also be referred to as a base station, a node B, an access point, and the like.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. A base station for a femto cell may be referred to as a femto base station or a home base station.

In the example shown in FIG. 1, the base stations 104a, 104b and 104c are examples of macro base stations for the coverage areas 110a, 110b and 110c, respectively. The base stations 104d and 104e are examples of pico and/or femto base stations for the coverage areas 110d and 110e, respectively. As will be recognized, a base station 104 may support one or multiple (e.g., two, three, four, and the like) cells.

The wireless network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
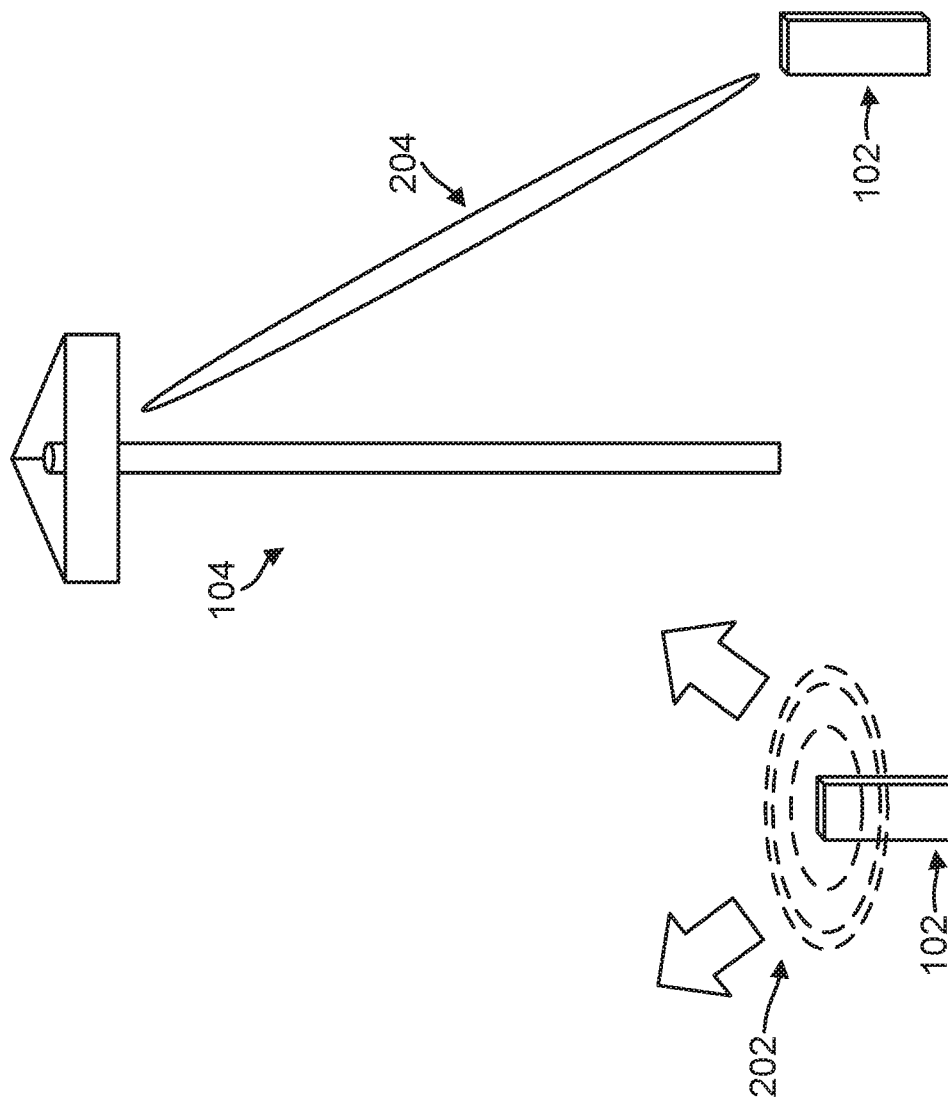
FIG. 2 illustrates a wireless communication network which uses sounding reference signals to enable beamforming at a base station.

Referring now to FIG. 2, there is shown an example of a system that may be used to enhance the efficiency of use of available bandwidth in wireless communications channels between one or more UEs 102 and one or more base stations 104, as discussed above with respect to FIG. 1. FIG. 2 illustrates one base station 104 and one UE 102 for purposes of simplicity of discussion, though it will be recognized that embodiments of the present disclosure may scale to many more UEs 102 and/or base stations 104. The UE 102 and the base station 104 may communication with each other at various frequencies. For example, in one embodiment the UE 102 and the base station 104 may communicate at sub-6 GHz frequencies, while in another embodiment at above 6 GHz frequencies, to name just two examples.

UE 102 broadcasts a sounding reference signal (SRS) 202 that is received by base station 104. In an embodiment, the SRS 202 may be an omni-directional transmission, while in another embodiment the SRS 202 may be a wide-beam transmission. Upon receipt of the SRS 202, the base station 104 is able to gather from the SRS 202, either explicitly or implicitly, channel information for the uplink channel between the UE 102 and the base station 104. The base station 104 may then use that uplink channel information to train its antennas to beamform a downlink 204 to the same UE 102.

Figure 3:
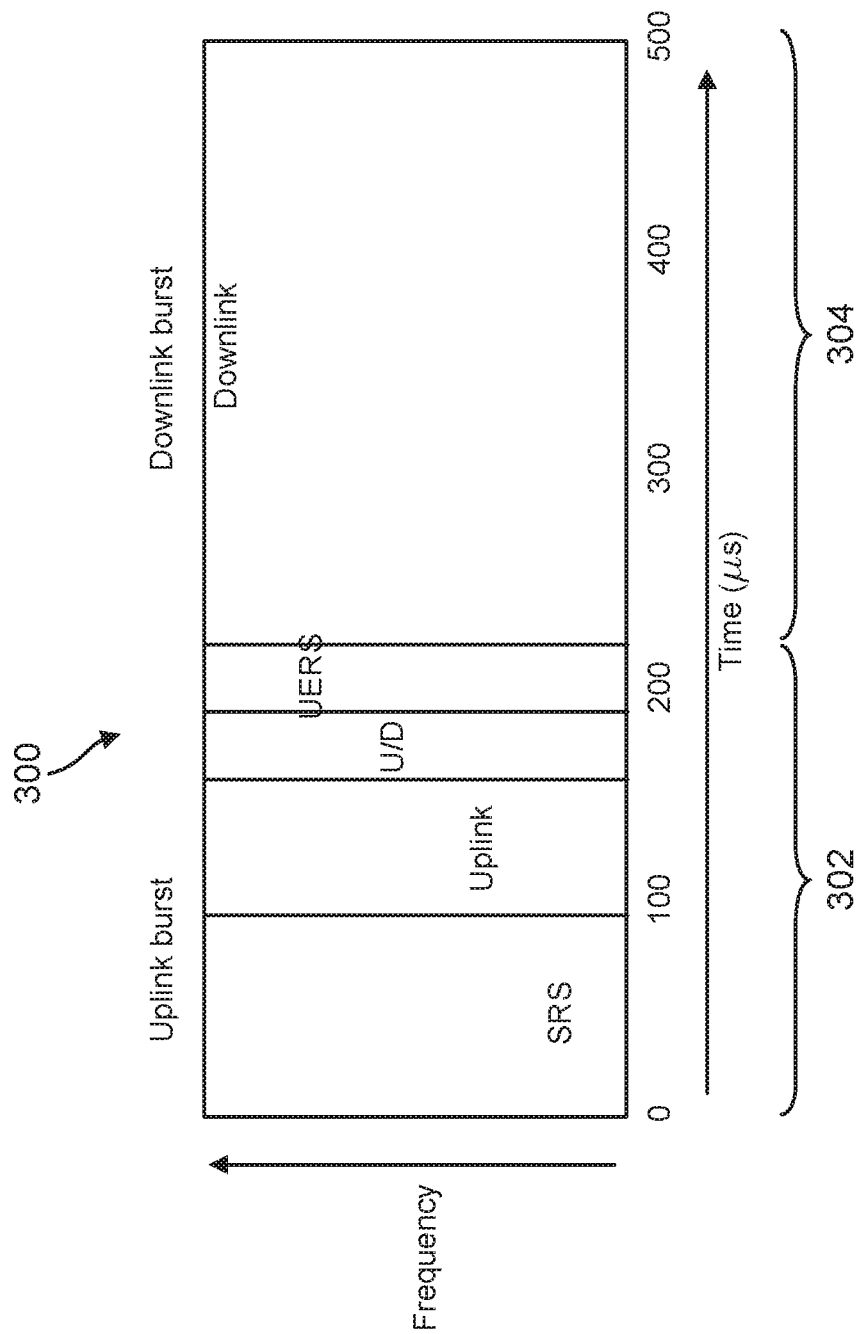
FIG. 3 illustrates an exemplary subframe structure.

To derive the most advantage from reciprocity (applying channel information obtained from the SRS 202 in the uplink), the base station 104 may rapidly re-apply that information (by training) for beamforming (or focusing) a downlink transmission to the UE 102 so as to minimize the effects of channel decorrelation. To assist in the rapid-reapplication of the channel information in the downlink, embodiments of the present disclosure utilize a short subframe structure. Referring now to FIG. 3, an exemplary subframe structure 300 is illustrated that operates within a short timeframe so as to minimize the effects of decorrelation in the channel. In an embodiment, the short timeframe may be approximately 500 microseconds, though it may also be shorter or longer than that. The short timeframe allows the base station 104 to essentially "freeze" the channel state for the duration of the subframe, during which the base station 104 may train and form the beam for the downlink and then provide a downlink burst.

Communications between UE 102 and base station 104 can be divided in the time domain into subframes (SFs) 300, such as the SF 300 illustrated in FIG. 3. A single subframe is illustrated in FIG. 3 for ease of illustration; as will be recognized, the structure of the SF 300 is scalable to any number of subframes as necessary or desired. Each SF 300 is divided into an uplink (UL) portion 302 and a downlink (DL) portion 304, separated by a transition portion U/D. As part of the UL portion 302, the UE 102 may send various types of signals to the base station 104. These may include, for example, an SRS (used here for transmit beamforming at the base station and in place of the uplink DMRS), uplink data, and optionally requests for information. The transition portion U/D is provided between the UL portion 302 and the DL portion 304. During the DL portion, the base station 104 sends various types of signals to the UE 102, including for example a user-equipment reference signal (UERS) and downlink data (e.g., in a downlink burst).

In some embodiments, the base station 104 may use the SRS in the UL portion 302 derive multiple pieces of information that facilitate the downlink between the UE 102 and the base station 104. For example, based on the SRS the base station 104 having multiple antennas is able to train its antennas to beamform the DL data transmitted back to the UE 102 so that, for instance, interference with other wireless communication devices in the range of the base station 104 is reduced. Beamforming relies on information about the channel between the UE 102 and the base station 104 that the base station 104 derives from the uplink SRS and then applies to the downlink based on reciprocity. The base station 104 can retrain its antennas as the channel changes over time (e.g., periodically or randomly), for example according to subsequent SRS received from the UE 102. This may happen, for example, if the UE 102 is moving or if other moving objects enter or leave the area/interfere with the uplink (or downlink) channel. According to embodiments of the present disclosure, the subframe 300 is provided as part of a synchronous system, such that the subframe 300 is provided repeatedly over time so that the base station 104 may retrain the beams to accommodate for UE 102 motion and channel decorrelation related to that movement (and/or other influences).

Channel reciprocity may allow the base station 104 to apply information about the channel in the UL direction to estimate one or more channel properties in the DL direction, which can be used to beamform the DL transmissions. In this manner, the base station 104 can train its antennas based on the SRS from the UE 102. The SRS may further include information that allows the base station 104 to demodulate data received from the UE 102 during the UL portion of the SF 300. The base station 104 may additionally determine, from the SRS, scheduling information that allows the base station 104 to schedule future SFs 300 (e.g., frequency bands, etc.) for communicating with the UE 102.

In some embodiments, multiplexing may be used to allow the base station 104 to communicate with multiple UEs 102 during the DL portion 304 of one SF 300. Beamforming can be advantageous because it allows the base station 104 to make use of space division multiplexing alongside other types of multiplexing, such as frequency division multiplexing and/or code division multiplexing. The base station 104 may therefore request that multiple UEs 102 send an SRS during one SF 300, allowing the base station 104 to retrain its antenna beamforming for each UE 102 that it will communicate with during that SF 300.

Referring now to FIG. 4, there is illustrated an embodiment of allocation of SF resources of a SF 400 in a multi-user MIMO (MU-MIMO) scenario. In the embodiment of FIG. 4, two UEs 102 are represented by SRS 1, SRS 2, for simplicity of discussion. It will be recognized that more UEs 102 may be included in various embodiments. Each UE 102 in the MU-MIMO system may transmit their SRS at the same time and on the same frequency allocation (i.e., using non-orthogonal physical resources) without collision by using, for example, permutation or scrambling to make each SRS unique. In this case, the base station 104 may request an SRS from multiple UEs 102 during the same SF 400 by sending a request during a DL portion 402 at the beginning of the SF 400. This request may include information instructing the UEs 102 how to scramble or permute their particular SRS (e.g., SRS 1 for a first UE 102 and SRS 2 for a second UE 102) to avoid interference. Alternatively, the UEs 102 may notice interference from other UEs 102 and decide to use a permutation, scrambling or the like to transmit an SRS using non-orthogonal physical resources. The UEs 102 may notify the base station 104 during the UL portion of SF 400 which permutation, scrambling or other method they will use to create a unique SRS.

Referring now to FIG. 5 which illustrates an alternative embodiment, either the UEs 102 or the base station 104 may determine a minimum processing gain (PG) needed to compensate for a poor channel, for example when a UE 102 is distant from a base station 104. The UE 102 may determine a minimum PG by monitoring how long it takes to successfully receive a SYNC signal from the base station 104. The base station 104 may determine a minimum PG by monitoring how long it takes to set up a random access channel (RACH) with the UE 102.

In order to achieve the minimum PG, the length of the SRS may need to be scaled to exceed the portion of the SF 500 allocated to the UL portion 502. The base station 104 may request an elongated SRS (illustrated in FIG. 5 as SRS 2) from a UE 102 during a DL portion 504 at the beginning of the SF 500, or alternatively the UE 102 may notify the base station 104 during the UL portion 502 of SF 500 that it needs to send an elongated SRS. However, as illustrated in SF 500, the UE 102 may still be able to transmit its elongated SRS using non-orthogonal physical resources because there is no danger of its low power signal affecting other UEs 102 in the environment. Therefore, the base station 104 need not instruct other UEs 102 in the environment to modify their behavior, nor do the other UEs 102 in the environment need to proactively modify their behavior.

In another embodiment, a single UE 102 with multiple antennas, such as in a single user MIMO (SU-MIMO) system, may send an SRS from each of its antennas simultaneously and on the same frequency (i.e., using non-orthogonal physical resources) without collision by using permutation, scrambling, or a different precoder across antennas to make each SRS at each antenna unique from the others at the other antennas. The SF 400 of FIG. 4 (originally described with respect to single antennas on multiple UEs 102) illustrates this embodiment, as multiple antennas on a single UE 102 function similarly to single antennas on multiple UEs 102. In this case (referring now to FIG. 4 for this alternative embodiment), the base station 104 may notify the UE 102 during a DL portion 402 at the beginning of the SF 400 how to create a unique SRS for each antenna, or alternatively the UE 102 may choose its own unique SRS for each antenna and notify the base station 104 what to look for.

Figure 6:
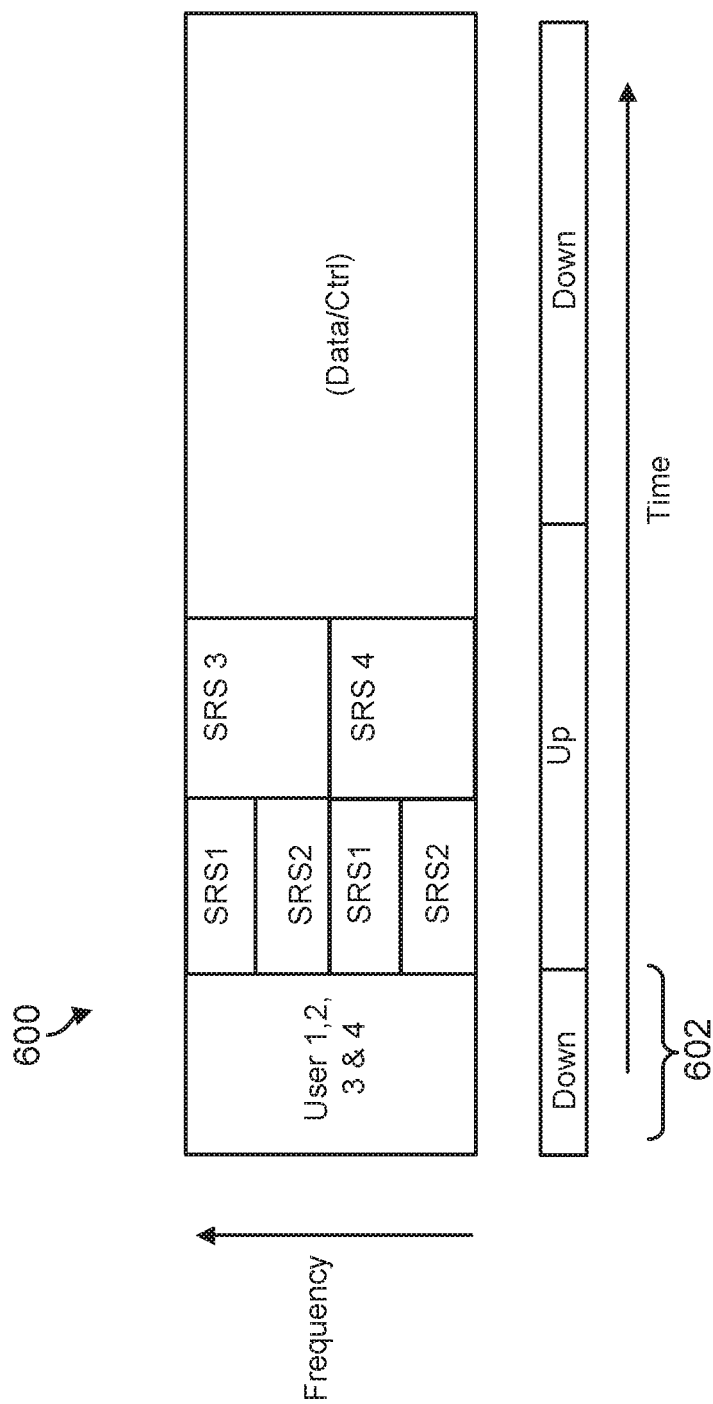
FIG. 6 illustrates an exemplary subframe structure for multiplexed SRS from a multi-antenna user equipment.

Referring now to FIG. 6, there is illustrated another MU-MIMO embodiment. In this embodiment, multiple UEs 102 (represented as users 1, 2, 3, and 4) may send respective SRS during the same SF 600. According to the embodiment of FIG. 6, the multiple UEs 102 may use unique sets of time and frequency allocations, i.e. using orthogonal physical resources, for the SRS from each respective UE 102. This may be necessary when UEs 102 are close to the base station 104, which results in very high power signals received at the base station 104, i.e. a very high UL signal-to-noise ratio (SNR). Such powerful signals could cause interference with each other even when using scrambling or permutations, so the signals may be allocated onto orthogonal physical resources to avoid collision. The allocations may be of contiguous portions of the system bandwidth. Alternatively, the allocations may be spaced out across tones to leave bandwidth in between the portions used by the UEs 102. The allocations need not be symmetrical between UEs 102. For example, as shown in SF 600, first and second UEs 102 may each be allocated two non-contiguous pieces of frequency spectrum within a first time period (represented by SRS 1 and SRS 2, respectively), while third and fourth UEs 102 may be each allocated contiguous blocks of frequency spectrum (represented by SRS 3 and SRS 4, respectively) within a second time period. In general, UEs 102 may be allocated one or more contiguous or non-contiguous blocks of spectrum over one or more contiguous or non-contiguous time periods. The base station 104 may recognize, for example based on a very short time to establish a RACH with the UE 102, that the power level of signals received from the UEs 102 is very high and that orthogonal resources should be used for the SRS from one or more of the UEs 102. The base station 104 may accordingly send instructions to the UEs 102 during a DL portion of the SF 600 allocating physical resources for the SRS of each UE 102. Alternatively, a given UE 102 may recognize that it has a very high UL SNR, for example based on a very short time to receive a SYNC signal from the base station 104, and may notify the base station 104 that the UE 102 needs its own allocation of physical resources for its SNR. Alternatively, the UE 102 may suggest a potential allocation to the base station 104.

In another embodiment, a single UE 102 with multiple antennas, such as in a SU-MIMO system, may send an SRS from each of its antennas during the same SF 600, but using unique sets of time and frequency allocations, i.e. using orthogonal physical resources. For example, as shown in SF 600, first and second antennas of UE 102 may each be allocated two non-contiguous pieces of frequency spectrum within a first time period (represented by SRS 1 and SRS 2, respectively), while third and fourth antennas of UE 102 may be allocated a single contiguous block of frequency spectrum within a second time period (represented by SRS 3 and SRS 4, respectively). In this case, the base station 104 may notify the UE 102 during a DL portion 602 at the beginning of the SF 600 of resource allocations for each antenna, or alternatively the UE 102 may choose its own resource allocations for each antenna and notify the base station 104 what to look for.

Figure 7:
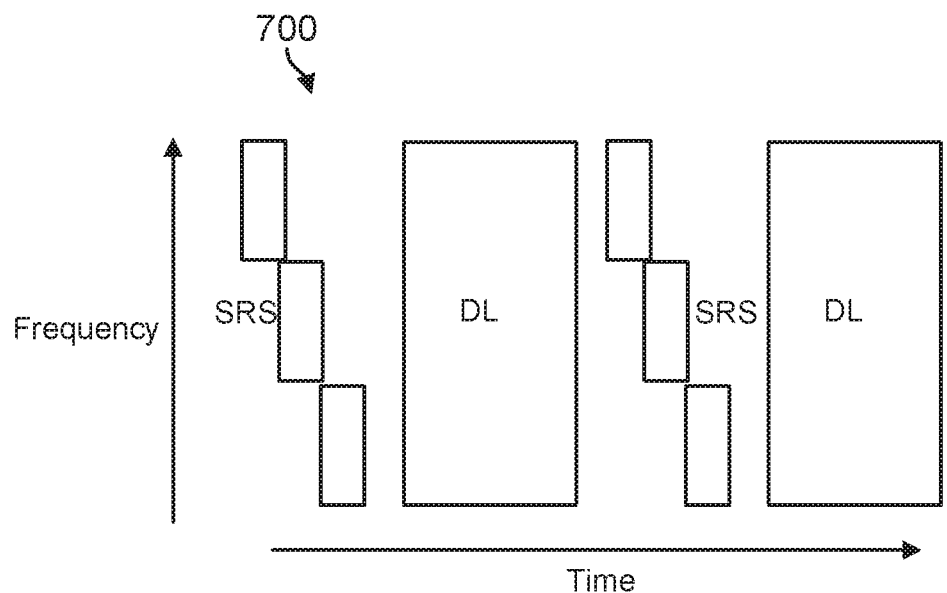
FIG. 7 illustrates an exemplary frame structure for an extended length SRS in a low-interference environment.

Referring now to FIG. 7, there is shown an embodiment where a UE 102 has a narrowband power amplifier (PA). In order to take advantage of channel reciprocity, which allows the base station 104 to beamform the DL channel based on the SRS of the UE 102, the SRS may need to cover the entire system bandwidth. If the UE 102 has a narrowband PA, it can only cover a sub-band of the system bandwidth with any given transmission. As illustrated in frame structure 700, the UE 102 may transmit multiple consecutive narrowband SRS at staggered frequencies that, together, cover the entire system bandwidth. The base station 104 may collect and combine the multiple consecutive narrowband SRS to obtain complete information about the system bandwidth of the downlink channel.

Figure 8:
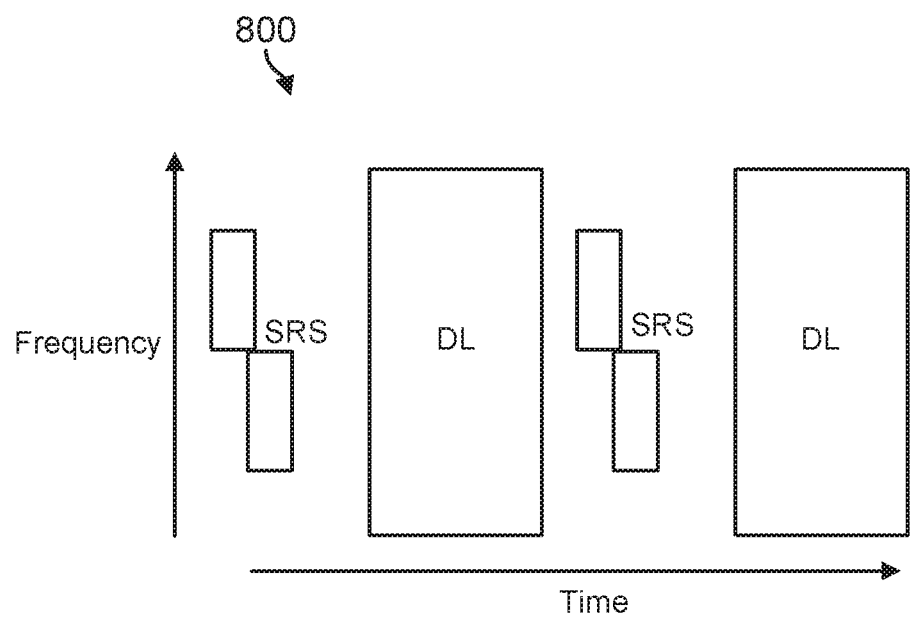
FIG. 8 illustrates an exemplary frame structure for an extended length SRS in a high-interference environment.

Referring now to FIG. 8, according to embodiments of the present disclosure information about some portion of the system bandwidth less than the whole may be sufficient for channel reciprocity to hold. The UE 102 may accordingly transmit only as many staggered narrowband SRS as necessary to reach the threshold for channel reciprocity, as illustrated by SF structure 800.

Figure 9:
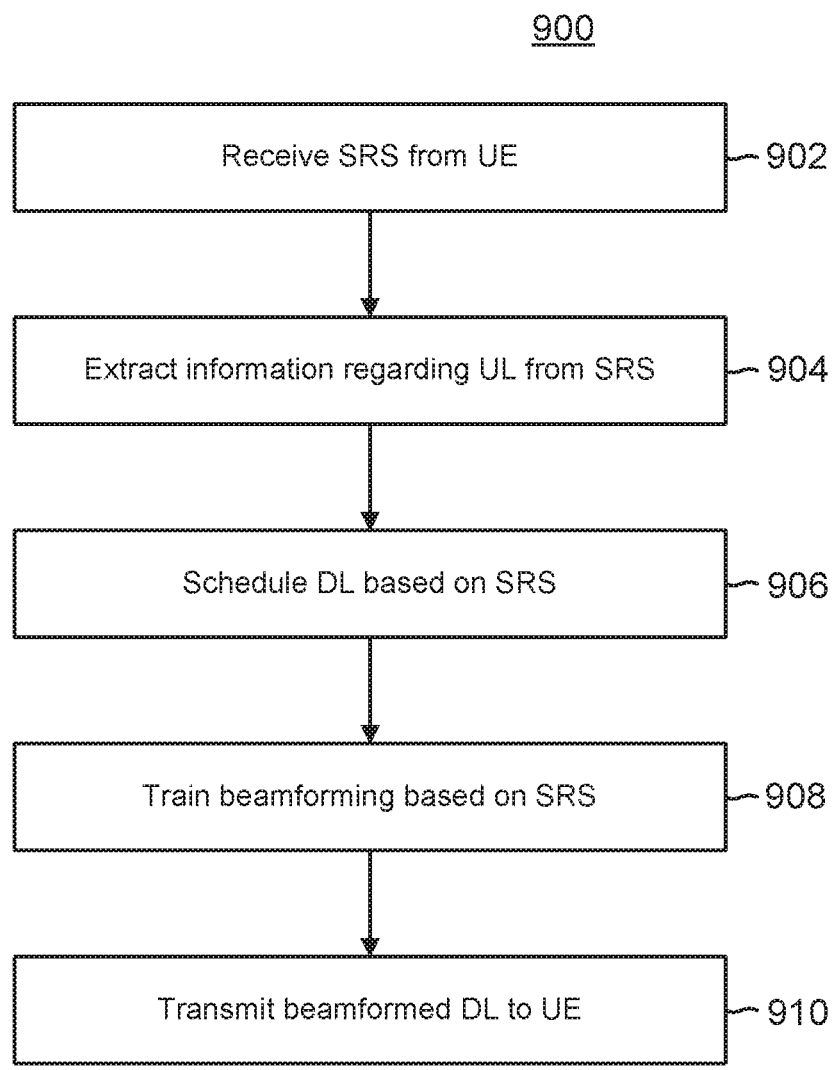
FIG. 9 is a flowchart illustrating an exemplary method for using an uplink sounding reference signal for channel estimation in accordance with various aspects of the present disclosure.

FIG. 9 is a flowchart illustrating an exemplary method 900 for using an uplink sounding reference signal for channel estimation in accordance with various aspects of the present disclosure. The method 900 may be implemented in the base station 104. The method 900 will be described with respect to a single base station 104 for simplicity of discussion, though it will be recognized that the aspects described herein may be applicable to any number of base stations 104. It is understood that additional method blocks can be provided before, during, and after the blocks of method 900, and that some of the blocks described can be replaced or eliminated for other embodiments of the method 900.

At block 902, a base station 104 receives an SRS from a UE 102 in an uplink communication, as described according to the various embodiments above. For example, the base station 104 may receive the SRS as part of an uplink portion of a subframe as illustrated in FIG. 3. According to the various embodiments of the present disclosure, the base station 102 may receive a single SRS from a single-antenna UE 102, multiple SRS corresponding to multiple antennas of a single UE 102, multiple SRS corresponding to single antennas of multiple UEs 102, and/or multiple SRS corresponding to multiple antennas of multiple UEs 102. Further, the SRS may be provided to the base station 104 according to non-orthogonal or orthogonal SRS, depending upon embodiment.

At block 904, the base station 104 extracts information about the uplink from the SRS received at block 902. This may include information useful in demodulating uplink data including in the uplink portion of the subframe, scheduling information, and channel information about the uplink channel.

At block 906, the base station 104 schedules the downlink communication (e.g., the downlink burst that is part of the downlink portion of a subframe), based on information extracted from the SRS at block 904.

At block 908, the base station 104 trains the beamforming for the one or more antennas of the base station 104 based on channel information extracted from the SRS received from the UE 102. Based on the SRS, the beamforming may be invariant to the number of antennas within the system, rendering embodiments of the present disclosure forward-compatible with future technologies that include more antennas (e.g., 16, 32, etc.) in MIMO arrays for example.

At block 910, as part of the same subframe, the base station 104 transmits a downlink burst including one or more reference signals (such as a UERS) as well as downlink data. With the beam forms of the antennas of the base station 104 trained based on the channel information derived from the uplink SRS, applied to the downlink by taking advantage of reciprocity during a short timeframe encapsulated by the subframe, the base station 104 is able to more improve its utilization of higher frequencies while still providing a substantially equivalent range that is possible with lower frequencies/evolution technologies (2G, 3G, 4G for example).

It is understood that method 900 may be implemented in program code stored on a computer readable medium. The program code may, for example, cause a processor to implement the blocks 902-910 upon reading the code from the computer readable medium. In some embodiments, the UE 102 and base station 104 of the present disclosure may include such a processor and such a computer readable medium with program code stored in it.

Figure 10:
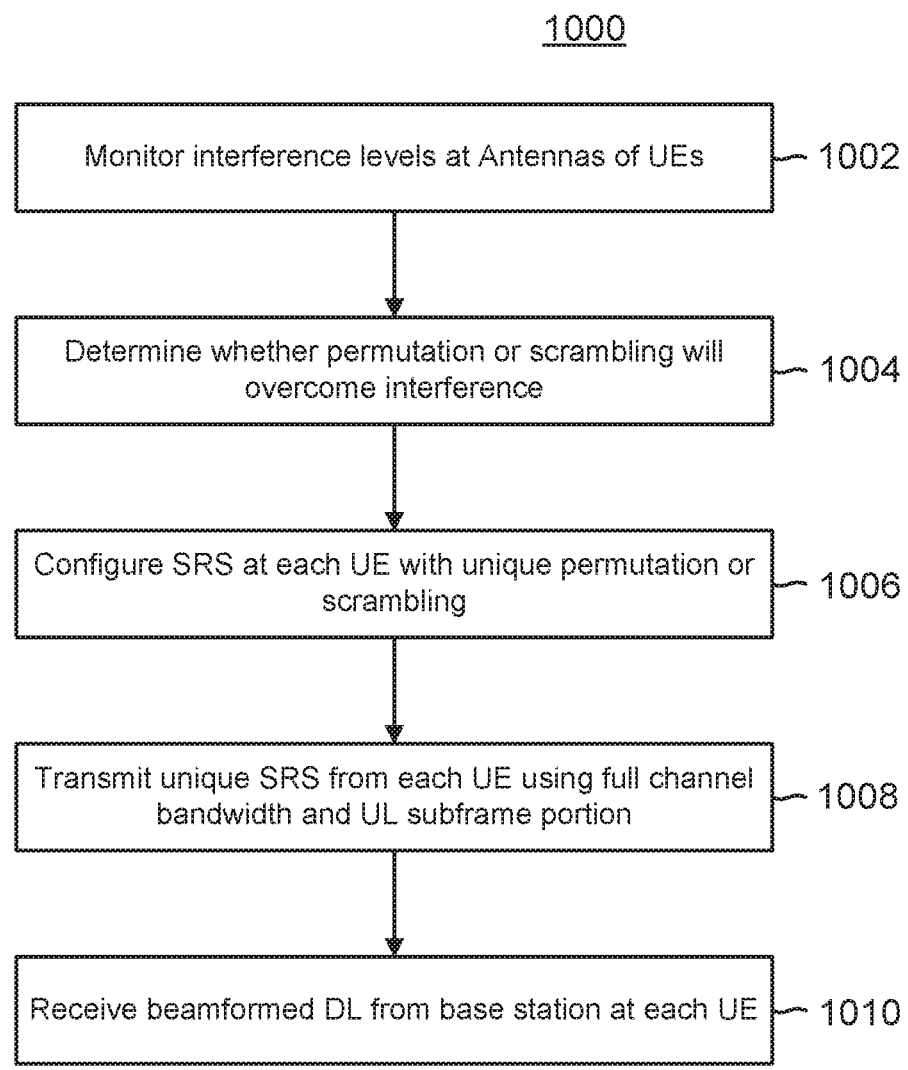
FIG. 10 is a flowchart illustrating an exemplary method for using an uplink sounding reference signal for channel estimation in accordance with various aspects of the present disclosure.

Turning now to FIG. 10, a flowchart is illustrated of an exemplary method 1000 for using a non-orthogonal uplink sounding reference signal for channel estimation in accordance with various aspects of the present disclosure. The method 1000 may be implemented in a UE 102. The method 1000 described is applicable to both single UEs 102 having multiple antennas and multiple UEs 102 that each have single antennas. It is understood that additional method blocks can be provided before, during, and after the blocks of method 1000, and that some of the blocks described can be replaced or eliminated for other embodiments of the method 1000.

At block 1002, the UE 102 monitors the interference level. For a single UE 102 having multiple antennas, this involves monitoring the interference level at each antenna of the UE 102. For multiple UEs 102 that each have a single antenna, this involves each UE 102 monitoring the interference level of its antenna.

At block 1004, the UE 102 (where multiple antennas) or UEs 102 (where each has a single antenna) determines whether a permutation (interleaving) or a scrambling code will better overcome the interference monitored at block 1002. For example, this may involve the UE 102 determining to use non-orthogonal coding where the UE 102 is power limited (e.g., the uplink SNR is low) or to enable MU-MIMO on the downlink (e.g., where the multiple UEs 102 each have multiple antennas).

At block 1006, in response to the determination at block 1004, the UE 102 configures the SRS for each of its antennas (or, for single-antenna UEs 102, each UE 102 for its respective antenna) with the unique permutation or scrambling code, as determined at block 1004.

With the SRS (of each antenna for a MIMO UE 102 or each antenna for each UE 102, depending upon embodiment) scrambled, at block 1008 the UE 102 (each SRS for each antenna or each UE 102) transmits the scrambled SRS to the base station 104 via the uplink channel. In an embodiment, the transmission may be done using the full channel bandwidth and the full uplink subframe portion (as discussed with respect to FIG. 3 above).

After the base station 104 receives the SRS in the uplink portion of the subframe from the multiple antennas of the UE 102 (or each antenna of each UE 102, depending upon the embodiment), the base station 104 derives channel state information from the SRS for the uplink channel and, based on reciprocity, applies the derived channel state information to the downlink channel. This includes training the beamform for the antennas of the base station 104 toward the UE 102.

As a result, at block 1010 the UE 102 receives a beamformed downlink burst from the base station 104 (at the multiple antennas of a single UE 102 or at each antenna of each UE 102 of many) as part of the downlink portion of the same subframe.

It is understood that method 1000 may be implemented in program code stored on a computer readable medium. The program code may, for example, cause a processor to implement the blocks 1002-1010 upon reading the code from the computer readable medium. In some embodiments, the UE 102 and base station 104 of the present disclosure may include such a processor and such a computer readable medium with program code stored in it.

Figure 11:
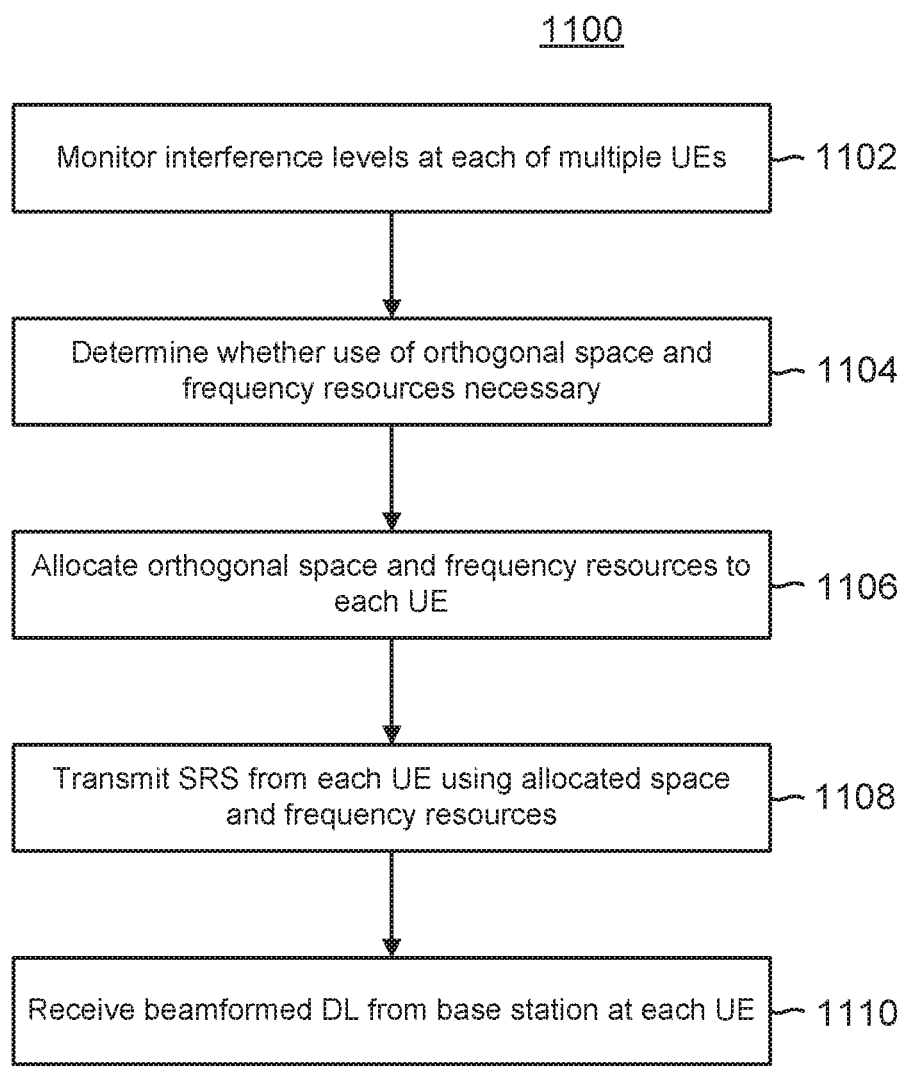
FIG. 11 is a flowchart illustrating an exemplary method for using an uplink sounding reference signal for channel estimation in accordance with various aspects of the present disclosure.

FIG. 11 illustrates a flowchart of an exemplary method 1100 for using an orthogonal uplink sounding reference signal for channel estimation in accordance with various aspects of the present disclosure. The method 1100 may be implemented in a UE 102. The method 1100 described is applicable to both single UEs 102 having multiple antennas and multiple UEs 102 that each have single antennas. It is understood that additional method blocks can be provided before, during, and after the blocks of method 1100, and that some of the blocks described can be replaced or eliminated for other embodiments of the method 1100.

At block 1102, the UE 102 monitors the interference level. For a single UE 102 having multiple antennas, this involves monitoring the interference level at each antenna of the UE 102. For multiple UEs 102 that each have a single antenna, this involves each UE 102 monitoring the interference level of its antenna, as described above with respect to FIG. 10.

At block 1104, the UE 102 (where multiple antennas) or UEs 102 (where each has a single antenna) determines whether the uplink SNR is sufficiently high to allow the SRS to be orthogonal—where each SRS at each antenna (either at a single UE 102 or multiple UEs 102) is allocated a different time/frequency combination physical resource.

At block 1106, in response to the determination at block 1104, the UE 102 configures the SRS for each of its antennas (or, for single-antenna UEs 102, each UE 102 for its respective antenna) with particular frequency/time combinations. For example, the frequency which each SRS is allocated may be contiguous to other frequencies assigned to other SRS or may be staggered across tones.

With the SRS of each antenna for a MIMO UE 102 (or each antenna for each UE 102, depending upon embodiment) assigned a different frequency/time physical resource, at block 1108 the UE 102 (each SRS for each antenna or each UE 102) transmits the SRS to the base station 104 via the uplink channel using the unique frequency/time physical resources.

After the base station 104 receives the SRS in the uplink portion of the subframe from the multiple antennas of the UE 102 (or each antenna of each UE 102, depending upon the embodiment), the base station 104 derives channel state information from the SRS for the uplink channel and, based on reciprocity, applies the derived channel state information to the downlink channel. This includes training the beamform for the antennas of the base station 104 toward the UE 102.

As a result, at block 1110 the UE 102 receives a beamformed downlink burst from the base station 104 (at the multiple antennas of a single UE 102 or at each antenna of each UE 102 of many) as part of the downlink portion of the same subframe.

It is understood that method 1100 may be implemented in program code stored on a computer readable medium. The program code may, for example, cause a processor to implement the blocks 1102-1110 upon reading the code from the computer readable medium. In some embodiments, the UE 102 and base station 104 of the present disclosure may include such a processor and such a computer readable medium with program code stored in it.

Figure 12:
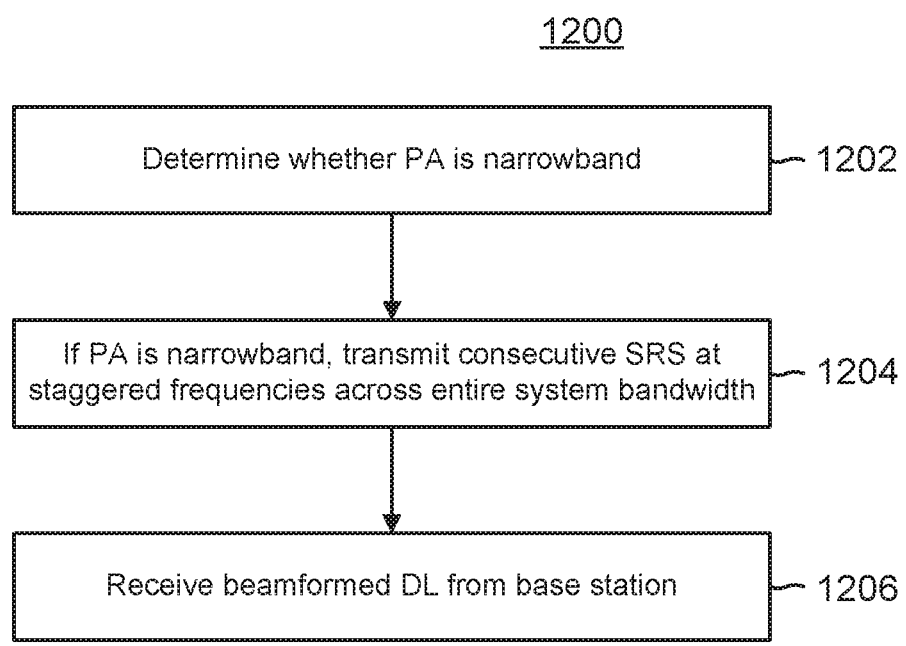
FIG. 12 is a flowchart illustrating an exemplary method for using an uplink sounding reference signal for channel estimation in accordance with various aspects of the present disclosure.

Turning now to FIG. 12, a flowchart is illustrated of an exemplary method 1200 for using an uplink sounding reference signal for channel estimation in accordance with various aspects of the present disclosure. The method 1200 may be implemented in a UE 102 that has a narrowband power amplifier. It is understood that additional method blocks can be provided before, during, and after the blocks of method 1200, and that some of the blocks described can be replaced or eliminated for other embodiments of the method 1200.

At block 1202, the UE 102 determines whether the power amplifier is narrowband. As described above, a narrowband power amplifier may only cover a sub-band of the system bandwidth with any given transmission.

At block 1204, in response to determining that the power amplifier of the UE 102 is narrowband, the UE 102 generates and transmits a series of consecutive SRS that are staggered across frequencies across a large portion of or the entire system bandwidth, for example as illustrated in FIG. 7, as part of the uplink portion of a subframe according to the embodiments discussed above.

In response, the base station 104 receives the consecutive SRS (in time, staggered across frequencies) and combines to obtain a substantially full view of the uplink channel information. The base station 104, using reciprocity, then in turn applies the channel information to the downlink channel and beamforms the antennas accordingly.

At block 1206, the UE 102 receives the beamformed downlink burst as part of the same subframe from the base station 104.

It is understood that method 1200 may be implemented in program code stored on a computer readable medium. The program code may, for example, cause a processor to implement the blocks 1202-1206 upon reading the code from the computer readable medium. In some embodiments, the UE 102 and base station 104 of the present disclosure may include such a processor and such a computer readable medium with program code stored in it.

Figure 13:
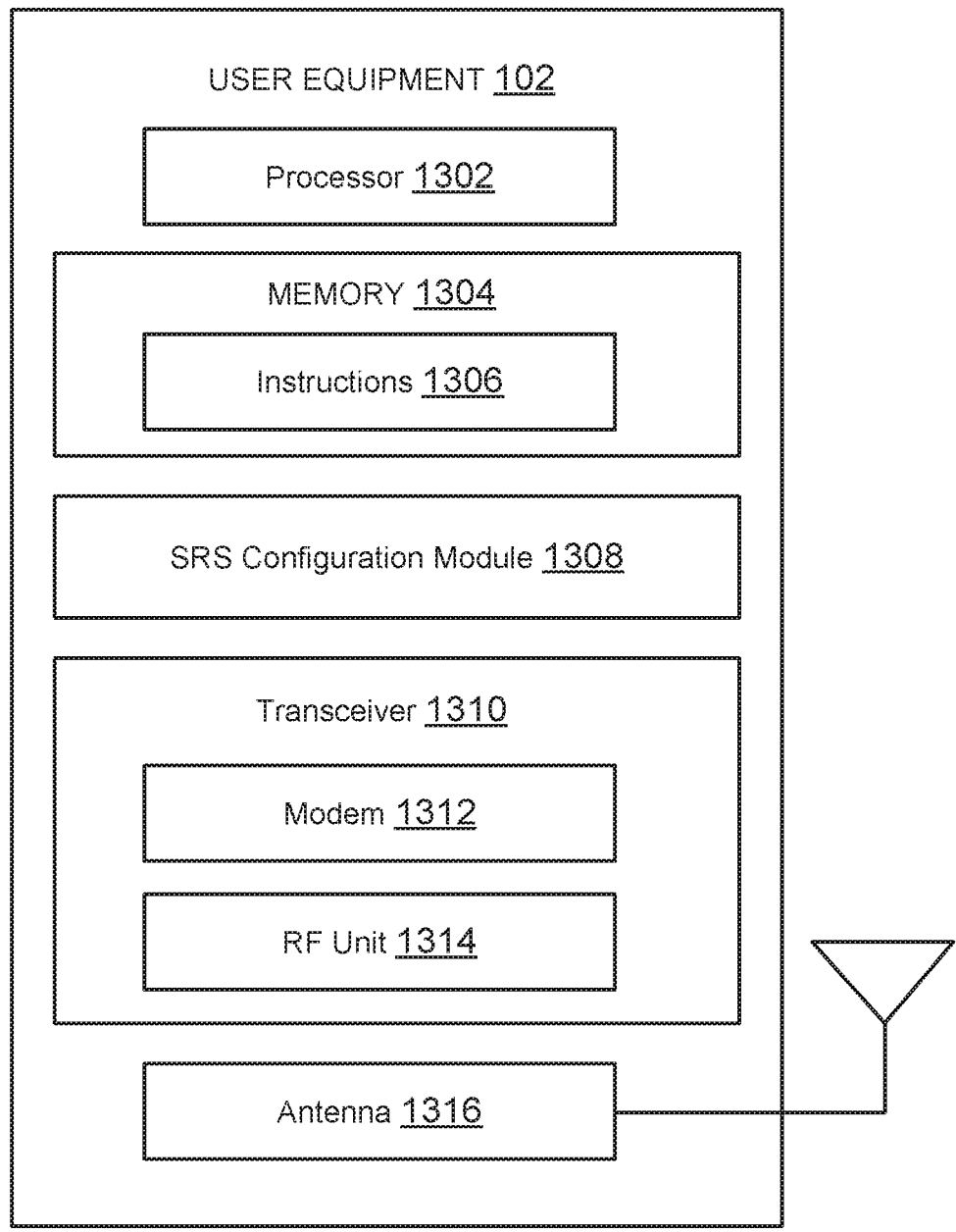
FIG. 13 is a block diagram of an exemplary wireless communication device, such as a user equipment, according to embodiments of the present disclosure.

FIG. 13 is a block diagram of an exemplary wireless communication device 1300 according to embodiments of the present disclosure. The wireless communication device 1300 may be a UE 102 as discussed above. As shown, the UE 102 may include a processor 1302, a memory 1304, an SRS configuration module 1308, a transceiver 1310 (including a modem 1312 and RF unit 1314), and an antenna 1316. These elements may be in direct or indirect communication with each other, for example via one or more buses.

The processor 1302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UEs 102 introduced above with respect to FIG. 1 and discussed in more detail above. In particular, the processor 1302 may be utilized in combination with the other components of the UE 102, including correlation information module 1308, to perform the various functions associated with orthogonal or scrambled SRS as described in greater detail above. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1304 includes a non-transitory computer-readable medium. The memory 1304 may store instructions 1306. The instructions 1306 may include instructions that, when executed by the processor 1302, cause the processor 1302 to perform the operations described herein with reference to the UEs 102 in connection with embodiments of the present disclosure. Instructions 1306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SRS configuration module 1308 may be used for various aspects of the present disclosure. For example, the SRS configuration module 1308 may be used to measure interference at the antenna or antennas of the UE 102. In one embodiment, the SRS configuration module 1308 may then determine whether permutation or scrambling will overcome the measured interference, and configure an SRS for each antenna with unique permutation or scrambling. In another embodiment, the SRS configuration module 1308 may determine whether use of orthogonal time and frequency resources (i.e. physical channel resources) for SRS transmission is necessary, and it may configure each antenna of the UE 102 to use orthogonal time and frequency resources for SRS transmission.

As shown, the transceiver 1310 may include the modem subsystem 1312 and the radio frequency (RF) unit 1314. The transceiver 1310 can be configured to communicate bi-directionally with other devices, such as base stations 104. The modem subsystem 1312 may be configured to modulate and/or encode the data from the correlation information 1308 and other aspects of the UE 102, such as processor 1302 and/or memory 1304, according to a modulation and coding scheme (MCS), e.g., a low-density parity check (LDPC) coding scheme, a turbo coding scheme, a convolutional coding scheme, etc. The RF unit 1314 may be configured to process (e.g., perform analog to digital conversion or digital to analog conversion, etc.) modulated/encoded data from the modem subsystem 1312 (on outbound transmissions) or of transmissions originating from another source such as a UE 102 or a base station 104. Although shown as integrated together in transceiver 1310, the modem subsystem 1312 and the RF unit 1314 may be separate devices that are coupled together at the UE 102 to enable the UE 102 to communicate with other devices.

The RF unit 1314 may provide the modulated and/or processed data, e.g. data packets (or, more generally, data messages that may contain one or more data packets and other information), to the antenna 1316 for transmission to one or more other devices. This may include, for example, transmission of . . . according to embodiments of the present disclosure. The antenna 1316 may further receive data messages transmitted from other devices and provide the received data messages for processing and/or demodulation at the transceiver 1310. Although FIG. 13 illustrates antenna 1316 as a single antenna, antenna 1316 may include multiple antennas of similar or different designs in order to sustain multiple transmission links.

Figure 14:
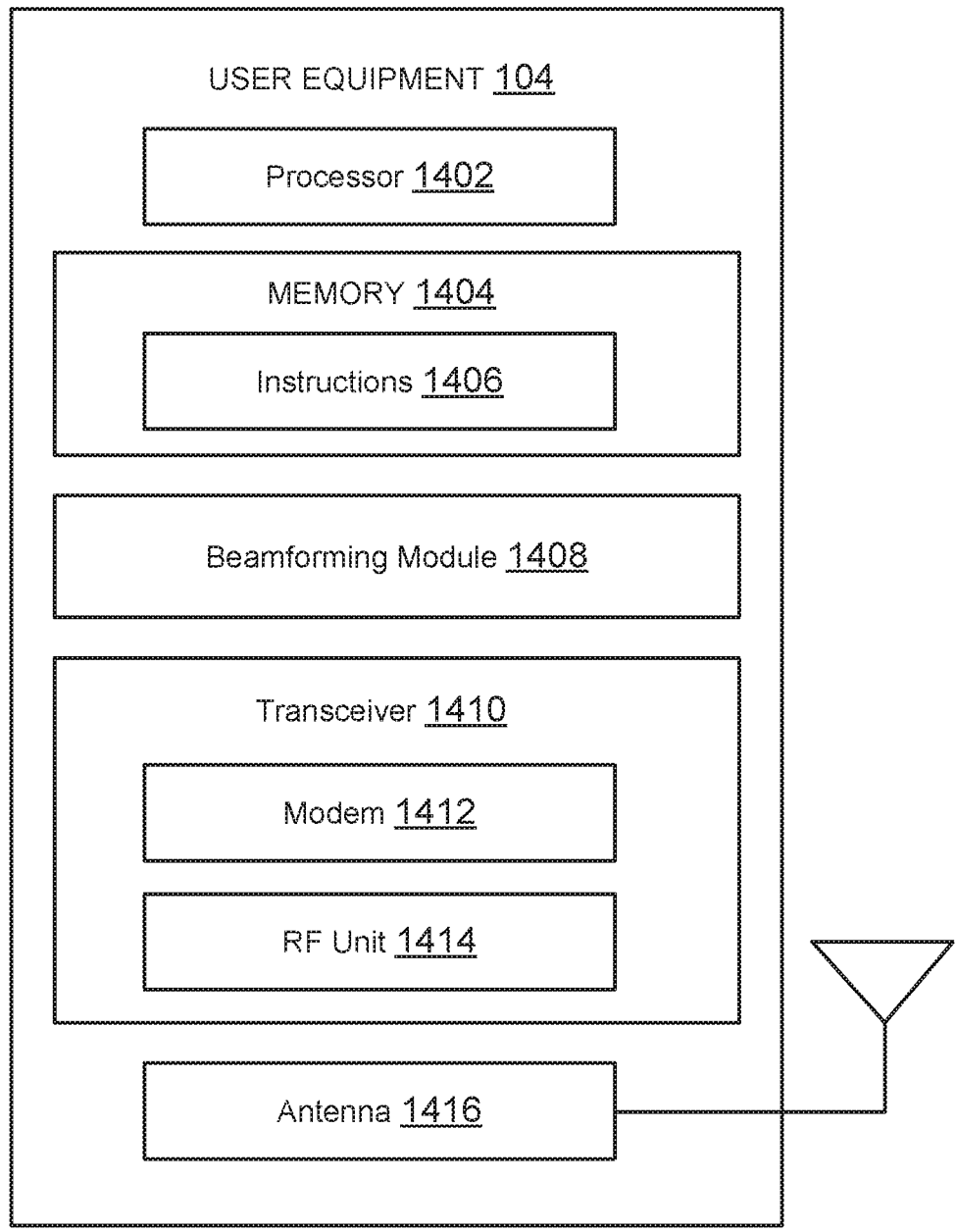
FIG. 14 is a block diagram of an exemplary wireless communication device, such as a base station, according to embodiments of the present disclosure.

FIG. 14 illustrates a block diagram of an exemplary base station 104 according to the present disclosure. The base station 104 may include a processor 1402, a memory 1404, a beamforming module 1408, a transceiver 1410 (including a modem 1412 and RF unit 1414), and an antenna 1416. These elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein with reference to the base stations 104 introduced in FIG. 1 above. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1404 may include a non-transitory computer-readable medium. The memory 1404 may store instructions 1406. The instructions 1406 may include instructions that, when executed by the processor 1402, cause the processor 1402 to perform operations described herein with reference to a base station 104 in connection with embodiments of the present disclosure. Instructions 1406 may also be referred to as code, which may be interpreted broadly to include any type of computer-readable statement(s).

The beamforming module 1408 may be used for various aspects of the present disclosure. For example, the beamforming module 1408 may be involved in extracting information from a SRS received from a UE 102 and using the extracted information to train beamforming for the one or more antennas 1416 for a downlink with the UE 102.

As shown, the transceiver 1410 may include the modem subsystem 1412 and the radio frequency (RF) unit 1414. The transceiver 1410 can be configured to communicate bi-directionally with other devices, such as UE 102 and/or another core network element. The modem subsystem 1412 may be configured to modulate and/or encode data according to a MCS, e.g., a LDPC coding scheme, a turbo coding scheme, a convolutional coding scheme, etc. The RF unit 1414 may be configured to process (e.g., perform analog to digital conversion or digital to analog conversion, etc.) modulated/encoded data from the modem subsystem 1412 (on outbound transmissions) or of transmissions originating from another source such as a UE 102. Although shown as integrated together in transceiver 1410, the modem subsystem 1412 and the RF unit 1414 may be separate devices that are coupled together at the base station 104 to enable the base station 104 to communicate with other devices.

The RF unit 1414 may provide the modulated and/or processed data, e.g. data packets (or, more generally, data messages that may contain one or more data packets and other information), to the antenna 1416 for transmission to one or more other devices. This may include, for example, use of beamforming to transmit information to a UE 102 according to embodiments of the present disclosure. The antenna 1416 may further receive data messages transmitted from other devices and provide the received data messages for processing and/or demodulation at the transceiver 1410. Although FIG. 14 illustrates antenna 1416 as a single antenna, antenna 1416 may include multiple antennas of similar or different designs in order to sustain multiple transmission links.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for communicating with a base station, comprising:
    determining, by a user equipment (UE), each one of multiple narrowband sounding reference signals (SRSs) based on a bandwidth capability of the UE being narrower than a system bandwidth of a channel;
    transmitting, from the UE, each one of the multiple narrowband SRSs at a different frequency sub-band during one subframe; and
    receiving, by the UE from the base station, a beamformed downlink communication based on information obtained from each one of the multiple narrow band SRSs corresponding to each of the different frequency sub-bands, wherein the beamformed downlink communication based on information obtained from each one of the multiple narrowband SRSs corresponding to each of the different frequency sub-bands comprises a beamformed downlink communication having a bandwidth greater than the width of each of the frequency sub-bands, wherein the different frequency sub-bands cover a portion of an entire bandwidth of the system bandwidth of the channel, wherein a number of different frequency sub-bands is selected based on a threshold for channel reciprocity.

2. The method of claim 1, wherein the different frequency sub-bands cover an entire bandwidth of the system bandwidth of the channel.

3. The method of claim 1, wherein transmitting each one of the multiple narrowband SRSs at a different frequency sub-band during one subframe comprises transmitting each one of the multiple narrowband SRSs during a different time resource of the one subframe.

4. A user equipment (UE), comprising:
    a processor configured to determine each one of multiple narrowband sounding reference signals (SRSs) based on a bandwidth capability of the UE being narrower than a system bandwidth of a channel; and
    a transceiver configured to:
        transmit each one of the multiple narrowband SRSs at a different frequency sub-band during one subframe; and
        receive from a base station a beamformed downlink communication based on information obtained from each one of the multiple narrowband SRSs corresponding to each of the different frequency sub-bands, wherein the beamformed downlink communication based on information obtained from each one of the multiple narrowband SRSs corresponding to each of the different frequency sub-bands comprises a beamformed downlink communication having a bandwidth greater than the width of each of the frequency sub-bands, wherein the different frequency sub-bands cover a portion of an entire bandwidth of the system bandwidth of the channel, wherein a number of different frequency sub-bands is selected based on a threshold for channel reciprocity.

5. The user equipment of claim 4, wherein the different frequency sub-bands cover an entire bandwidth of the system bandwidth of the channel.

6. The user equipment of claim 5, wherein transmitting each one of the multiple narrowband SRSs at a different frequency sub-band during one subframe comprises transmitting each one of the multiple narrowband SRSs during a different time resource of the one subframe.

* * * * *